(12) United States Patent
Simic et al.

(10) Patent No.: US 12,524,941 B2
(45) Date of Patent: Jan. 13, 2026

(54) SYSTEMS FOR GENERATING DYNAMIC PANORAMIC VIDEO CONTENT

(71) Applicant: 2immersive4u, North Royalton, OH (US)

(72) Inventors: Dusan Simic, North Royalton, OH (US); Filip Milinkovic, North Royalton, OH (US)

(73) Assignee: 2immersive4u, North Royalton, OH (US)

( * ) Notice: Subject to any disclaimer, the term of this patent is extended or adjusted under 35 U.S.C. 154(b) by 537 days.

(21) Appl. No.: 17/968,578

(22) Filed: Oct. 18, 2022

(65) Prior Publication Data

US 2023/0120437 A1 Apr. 20, 2023

Related U.S. Application Data

(60) Provisional application No. 63/256,646, filed on Oct. 18, 2021.

(51) Int. Cl.
*G06T 13/40* (2011.01)
*G06T 19/00* (2011.01)

(52) U.S. Cl.
CPC .............. *G06T 13/40* (2013.01); *G06T 19/00* (2013.01); *G06T 2200/24* (2013.01)

(58) Field of Classification Search
CPC ...... G06T 13/40; G06T 19/00; G06T 2200/24
See application file for complete search history.

(56) References Cited

U.S. PATENT DOCUMENTS

| | | | | |
|---|---|---|---|---|
| 5,600,368 | A * | 2/1997 | Matthews, III | H04N 7/17318 348/E7.071 |
| 2010/0123737 | A1 * | 5/2010 | Williamson | G06T 15/20 345/672 |
| 2015/0380051 | A1 * | 12/2015 | Segal | H04N 5/2222 386/282 |
| 2016/0381341 | A1 * | 12/2016 | El Choubassi | H04N 13/111 348/43 |
| 2017/0332064 | A1 * | 11/2017 | Martineau | G06T 19/006 |
| 2018/0191955 | A1 * | 7/2018 | Aoki | G11B 27/102 |
| 2019/0066387 | A1 * | 2/2019 | Grossmann | G06F 3/011 |

* cited by examiner

*Primary Examiner* — Terrell M Robinson
(74) *Attorney, Agent, or Firm* — Thomas E. Lees, LLC

(57) ABSTRACT

A process for generating dynamic panoramic video content comprises receiving an animation having an environment and creating a timeline for the animation having the environment. The process further comprises receiving cinematographic elements, which include a reference point and a panoramic angle. A position of the reference point within the animation having the environment is based on the timeline, and the panoramic angle that includes a range of possible fields of view from the reference point. The animation having the environment is rendered based on the timeline and the cinematographic elements to create a rendered animation. A field of view with an angle that is less than the panoramic angle is defined. Ultimately, an export animation is created based on the rendered animation, where the export animation allows a viewer to adjust a direction of the field of view from the reference point when the viewer is watching the export animation.

20 Claims, 10 Drawing Sheets

SYSTEMS FOR GENERATING DYNAMIC PANORAMIC VIDEO CONTENT

CROSS-REFERENCE TO RELATED APPLICATIONS

The present disclosure claims the benefit of U.S. Provisional Application No. 63/256,646 filed Oct. 18, 2021, having the title "Application of Traditional Movie Elements in Assembly of 180° Animated Videos", the disclosure of which is incorporated by reference in its entirety.

BACKGROUND

Embodiments herein relate to video content production, e.g., to animations and other video productions, and more particularly, to systems and/or processes for video content creation having a user-controllable view within captured panoramic scenes (e.g., within a 180° video production) where the scenes are generated from dynamically changing perspectives.

Computer-generated virtual reality (VR) environments typically include scenes and objects that a user can interact with. In this regard, virtual reality systems build a world in which a user is fully immersed such that everything (or most everything) the user sees and experiences is part of an artificial environment. In this regard, standard virtual reality systems utilize specialized hardware that includes near-eye displays to provide the user a first person perspective into the computer-generated environment.

BRIEF SUMMARY

According to aspects of the present invention, a process for generating dynamic panoramic video content comprises receiving an animation having an environment, e.g., by video editing/creation software on a computer system. The process also comprises creating a timeline for the animation. The process further comprises receiving cinematographic elements, which include a reference point and a panoramic angle. A position of the reference point within the animation is based on the timeline, and the panoramic angle includes a range of possible fields of view from the reference point. The process yet further comprises rendering the animation including the environment, based on the timeline and the cinematographic elements to create a rendered animation.

In some embodiments, a field of view is defined with an angle that is less than the panoramic angle. Ultimately, an export animation is created based on the rendered animation, where the export animation allows a viewer to adjust a direction of the field of view from the reference point when the viewer is watching the export animation.

In some embodiments, receiving an animation having an environment includes also receiving animation of characters within the environment.

In various embodiments, creating a timeline for the animation having the environment includes receiving a storyboard for the animation having the environment and creating the timeline based on the storyboard for the animation having the environment.

In some embodiments, the reference point jumps to discrete positions within the environment based on the timeline, e.g., responsive to a corresponding cinematographic element.

In other embodiments, the reference point smoothly transitions to positions within the environment based on the timeline, e.g., responsive to a corresponding cinematographic element.

In some embodiments, the export animation can include a mix where the reference point sometimes jumps to discrete positions within the environment and sometimes smoothly transitions, e.g., responsive to a corresponding cinematographic element.

In several embodiments, the reference point location within the environment is independent of a location of the viewer (e.g., independent of an absolute position, relative position, or both).

In various embodiments, rendering the animation having the environment based on the timeline includes adding lighting, additional effects, three-dimensional simulations of the environment, or combinations thereof.

In numerous embodiments, creating an export animation includes adding motion graphics to 2-dimensional animation, adding visual effects to 2-dimensional animation, color correction, or combinations thereof.

According to further aspects of the present disclosure, a process for generating dynamic panoramic video content comprises receiving an animation having an environment and creating a timeline for the animation having the environment. The process further comprises rendering the animation based on the timeline to create a rendered animation. Further, the process comprises receiving cinematographic elements, which include a reference point and a panoramic angle. A position of the reference point within the animation having the environment is based on the timeline, and the panoramic angle that includes a range of possible fields of view from the reference point. Moreover, a field of view with an angle that is less than the panoramic angle is defined. Ultimately, an export animation is created based on the rendered animation and the cinematographic elements, where the export animation allows a viewer to adjust a direction of the field of view from the reference point when the viewer is watching the export animation.

According to more aspects of the present disclosure, a process for generating dynamic panoramic video content comprises receiving a script and concept art. A storyboard is created based on the script and the concept art, and animation having an environment is created based on the storyboard, the script, and the concept art. Further, cinematographic elements such as reference points are received, and an image sequence is created based on the animation having the environment and the received cinematographic elements. An export animation is created based on the image sequence, where the export animation allows a viewer to adjust a direction of a field of view from a reference point when the viewer is watching the export animation.

DETAILED DESCRIPTION

Embodiments herein relate to video content production, also referred to herein as animations. More particularly, aspects herein relate to systems and processes used in video production that enable the creation of panoramic scenes that include a user-controllable field of view within the various panoramic scenes, where a reference point defining the perspective of the various panoramic scenes can be predetermined and can dynamically change throughout the video. In this regard, as the animation plays, an individual watching the animation can interact with a graphical user interface of the playback device to alter a field of view within the animation, to the extent of the panorama associated with the currently viewed scene. In this regard, aspects herein are particularly suited to virtual reality, augmented reality, real-world video, or combinations thereof.

In conventional virtual reality, a user wears specialized hardware that places display screens close to the user's eyes. While this can produce an immersive experience, the result is an environment that is limited to first-person perspective views. While this may be acceptable for certain applications, the experience becomes severely limiting for animations that include storytelling. The first-person perspective also becomes significantly limiting when specialized hardware is unavailable, requiring the user to view the content on a two-dimensional display, e.g., a desktop computer, tablet, smartphone, etc.

However, the present disclosure solves the problems of virtual reality rendering by providing systems and processes that enable rendering virtual reality video content that provides dynamic perspective changes, e.g., in a manner similar to cinematographic effects. This drastically improves the technology of virtual reality rendering by enabling a content creator to direct a user to a particular focus, while simultaneously allowing the user to retain full virtual reality control of determining where, within the currently viewable scene, to focus a field of view to be displayed.

Video Content Overview

Figure 1:
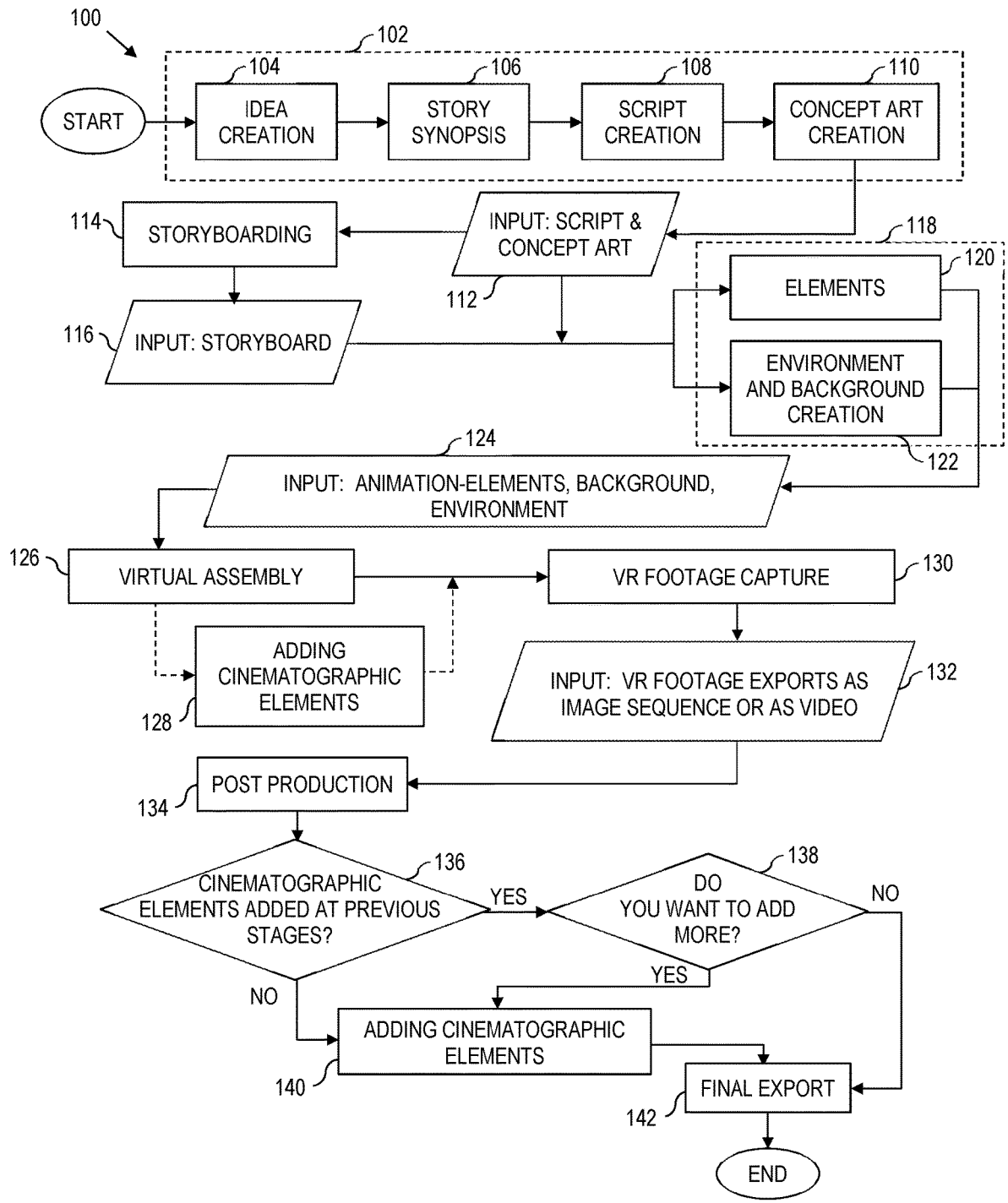
FIG. 1 is a block diagram of a process for building dynamic video content, according to aspects herein.

Referring now to the drawings, and in particular to FIG. 1, a process diagram shows an example process 100 of generating video content. Whereas FIG. 1 shows several processing steps, in practice, a video can be generated using any one or more of the steps in any combination. Thus, strict adherence to the illustrated steps and/or the order of steps is not required unless otherwise specified. Moreover, the processing steps can be carried out on a suitable processing device such as a computer, server, etc., having sufficient processing power and video rendering capability to carry out video editing and content creation.

A first optional story preparation process 102 may be carried out. The story preparation process 102 can be useful for setting forth the flows necessary to create the video. By way of non-limiting but explanatory example, a story preparation process 102 can comprise any one or more of idea creation at 104, story synopsis capture at 106, script creation at 108, concept art creation at 110, etc.

The idea creation at 104 digitally records in a data source associated with the computer processing device, data that characterizes key elements associated with a video to be generated. Thus, the idea creation can be implemented as a data source that catalogs ideas, concepts, and other features that may be ultimately integrated into the video content.

The story synopsis capture at 106 digitally captures in a data source, a brief summary or general survey of the storyline to be carried out in the video.

The script creation at 108 digitally captures in a data source, one or ore digital files that organize a script associated with the storyline to be carried out in the video.

The concept art creation at 110 digitally captures in a data source, digital art associated with the storyline to be carried out in the video.

A first input 112 is optionally performed to provide to a video generator, information collected at the first optional story preparation process 102. The inputs can include for example, a script created at the script creation at 108, concept art created at the concept art creation at 110, etc.

An optional storyboarding process is carried out at 114. For instance, the inputs from the script creation at 108 and/or the concept art creation at 110 can be utilized to generate a digital storyboard at 116 (e.g., using Photoshop, Adobe Premier, etc.). By way of example, the storyboard generated at 116 can implement an electronic planning document to illustrate a story or show the changes of scenes. Notably, the storyboard can be associated with a digital representation of a timeline or other mechanism that controls progression or navigation through the video content.

An animation collection component 118 receives as inputs, the contents generated at the first input 112 (e.g., the script, concept art, combinations thereof, etc.), the storyboard content at 116, or both. By way of example, the animation collection component 118 may comprise an elements component 120, and an environment and background creation component 122. The elements component 120 is utilized to collect and store digital models and other necessary digital data of the desired elements, such as characters, features, objects and other animations of the video. The background creation component 122 stores digital files, models, textures, skins, data files, etc., necessary to define the environment and background features of the video.

The elements component 120 is utilized to generate elements for incorporation into the video, such as animations and other digital content to implement characters, artifacts (including models), features, props, scene components, etc., necessary for the story of the video.

The environment and background creation component 122 is utilized to generate backgrounds, models, textures, environmental elements, etc., necessary for the video (e.g., using Maya, Substance Painter, other software, etc., or combinations thereof). Thus, the animation may include elements, environment, artifacts, characters, etc., or combinations thereof.

A second input 124 receives generated content from the animation collection component 118. For instance, in the illustrated example, the second input 124 receives the animation from the elements component 120, background and/or environment from the environment and background creation component 122, etc.

A virtual assembly is performed at 126 using the content, e.g., animations, background, environment, etc., at the second input 124. In some embodiments, the virtual assembly of the video is carried out according to the storyboard and follows a timeline to identify scenes, transitions, and other progressions of the video.

During the virtual assembly at 126, the process 100 can utilize a first cinematographic component 128 to add cinematographic elements.

The cinematographic component 128 utilizes cinematographic elements, which differentiates the process 100 from conventional virtual reality. For instance, the cinematographic elements can be used to change a reference point that determines a perspective for the video content. In this regard, the reference point can represent a location of a "virtual camera" within the animation environment.

Notably, the reference point is not limited to first person, but rather, can be any reference point. Moreover, the reference point does not have to move continuously through the video time frames. Rather, the reference point can jump or change dynamically and/or move discontinuously, e.g., from a first person view to an arial view to a third person view relative to a main character of the video, etc., e.g., in a manner analogous to cuts in cinematography. Examples of the cinematographic process carried out by the cinematographic component 128 are described in greater detail herein.

Video footage capture is carried out at 130. The video footage captures the content (e.g., the animations processed from above) in a panoramic angle that includes a range of possible fields of view from the reference point. By way of example, virtual reality is often captured in a 180° or 360° (180 degrees or 360 degrees) format. While these formats represent typical view formats, aspects herein are not limited to any particular angle limitations.

The captured video footage is input at 132 as an image sequence or video, e.g., in any desired frame rate. Here, the captured video footage is based upon the cinematographic component 128 to define the changes in the reference point, which correspondingly changes the location and/or orientation of the panoramic angle.

By way of example, using the process 100 of FIG. 1, a computer process can be carried out for generating dynamic panoramic video content. Here, the process includes receiving an animation having an environment, e.g., via the animation collection component 118.

A timeline is created for the animation, e.g., as part of the story preparation process 102, the storyboarding 114, the virtual assembly at 126 or at another part of the process of FIG. 1. In some embodiments, the timeline is a digital timeline that corresponds to the length of the video, and can be used as a virtual timecode to identify a select frame, group of frames, scene, segment, or other feature of the animation (video).

In the creation of the video, a reference point is used to define a position within the animation (e.g., within the environment of the animation). Thus, the reference point can be associated with content capture, e.g., via a camera, virtual camera, gaming or animation engine scene rendering, etc., In some embodiments, the reference point is based on the timeline. That is, the reference point changes as the video plays back. The timing of such changes, and the nature of such changes depends upon the desired effect intended for the video, examples of which are described more fully herein with regard to cinematographic effects.

A panoramic angle, e.g., captured by the camera, virtual camera, or other wise generated, includes a range of possible fields of view from the reference point. As a few examples, the panoramic angle may be defined as 180 degrees, 360 degrees, omnidirectional, etc. The view presented in the video will be something less than the panoramic angle, such that the capture includes more of the environment/scene than is actually displayed in the video. Here, cinematographic elements are used to control the reference point, e.g., to move the location of the reference point, to change an orientation of the reference point, to change a focus or zoom from the reference point, combinations thereof, etc. This can be carried out, for example, by the second input 124, virtual assembly 126, cinematographic process 128. The animation/video is rendered including the environment based on the timeline and the cinematographic elements to create a rendered animation.

The process 100 thus renders at 132 (e.g., via Unreal Engine) the animation based on the timeline and the cinematographic elements to create a rendered animation. In some embodiments, the rendering is carried out in such a way that an individual that views the animation (video content) can interact with an input of the playback device (e.g., touchscreen, accelerometer, mouse, etc.) to control the field of view within the range available by the panorama, thus determining which available elements of the scene are displayed. Notably, the content creator, by virtue of the cinematographic component 128, can alter the reference point dynamically throughout the playback of the animation so as to steer/direct the focus of the individual viewing the animation playback to content determined to be relevant by the content creator in such a way that the animation is not constrained to first person views. For example, if the panoramic angle is 360° around the reference point, the field of view may be 135° extending from the reference point. The viewer may adjust the field of view (around the reference point) to see any portion of the panoramic angle extending from the reference point. The field of view itself may be fixed, or the field of view can also change, e.g., to simulate various visual effects.

In other embodiments, the ability of the viewer to change the field of view can be added in as part of an optional post production component of the process 100.

For instance, the process 100 can carry out any desired post production at 134. Examples of post production are described more fully herein. Additionally, post processing can include any optional subsequent processing after post production at 134.

For instance, as illustrated, a decision can be made at 136 as to whether cinematographic elements were previously added, e.g., at the cinematographic component 128. If yes, a decision can be made as to whether additional cinematographic effects are to be added at 138.

If the decision at 136 is NO or the decision at 138 is YES, then a cinematographic component 140 is carried out in a manner analogous to the cinematographic component 128. Post production may also be carried out in any desired software such as Adobe Premier, After Effects, etc.

If no additional effects or processing are required, e.g., the decision at 138 is NO, or cinematographic elements are added at 140, then a final export of the video is carried out at 142.

Thus, keeping with the above example, the process can define a field of view with an angle that is less than the panoramic angle. Here, defining the field of view can be literal or inherent based upon constraints, defaults, parameters, etc., of the video creation software. The process thus creates an export animation based on the rendered animation, where the export animation allows a viewer to adjust a direction of the field of view from the reference point when the viewer is watching the export animation.

Example Processes

FIG. 2A-FIG. 2E illustrate a set of subprocesses, which can be combined in any combination for an overall process, e.g., to implement the process 100 of FIG. 1, to augment the process 100 of FIG. 1, etc. In this regard, not all of the subprocesses must be implemented. In the description below if a subprocess is indicated as ending, the subprocess may end or flow to another one of the subprocesses as discussed herein.

Virtual Assembly

Figure 2A:
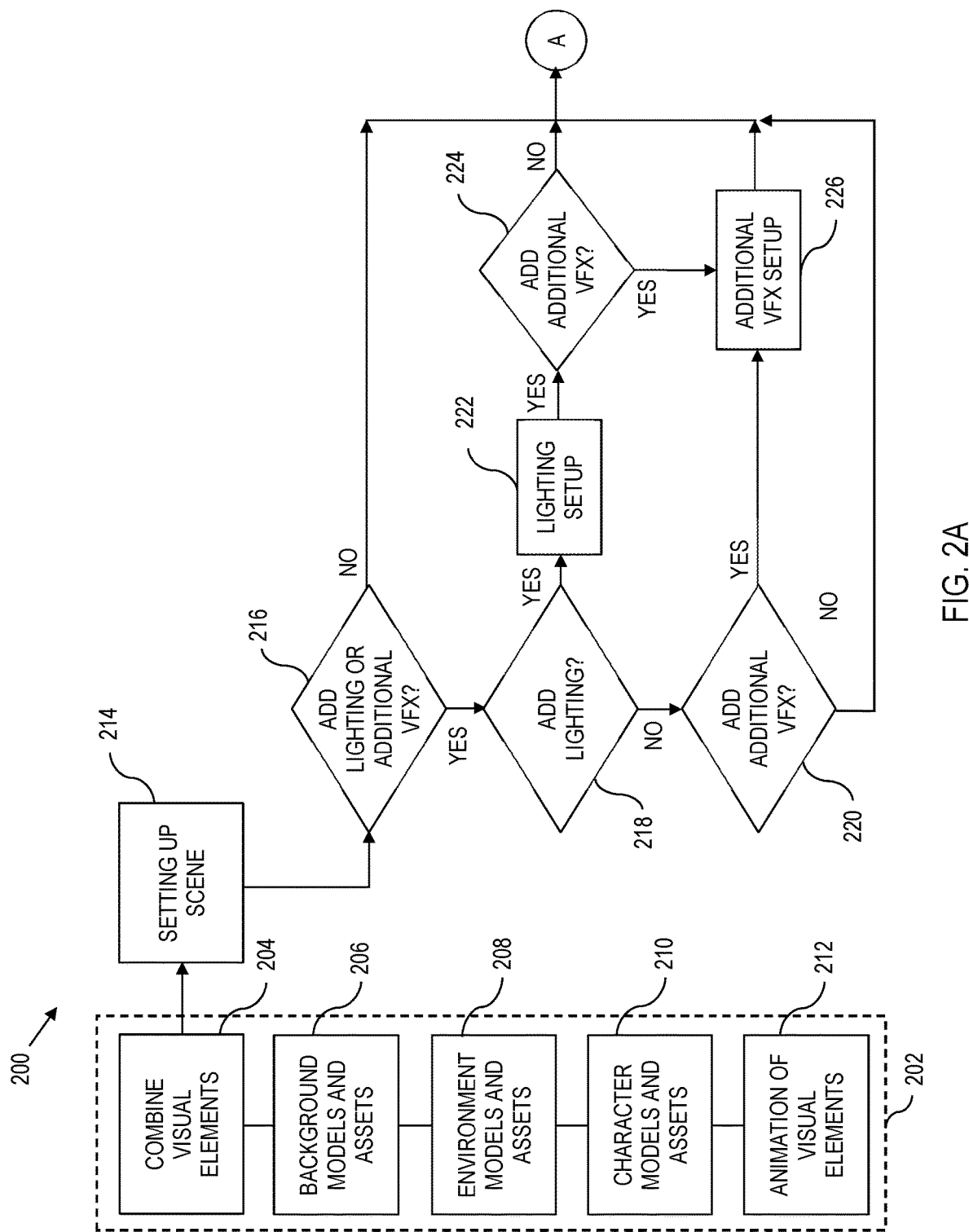
FIG. 2A is a block diagram of a virtual assembly process according to aspects herein.

Referring to FIG. 2A, a block diagram illustrates an example of a virtual assembly subprocess 200 according to aspects herein. The subprocess 200 can be utilized to implement the virtual assembly process 126 (FIG. 1).

At 202, visual elements are generated and/or combined. For instance, the subprocess at 202 can include combining visual elements at 204, generating background models and assets at 206, generating environmental models and assets at 208, generating character models and assets at 210, generating animations of visual elements at 212, combinations thereof, etc.

The subprocess 200 sets up a scene of the animation/video at 214. The scene is based upon numerous factors including the timeline, storyboard, visual elements to be depicted, reference point, panoramic view, features from the element generation at 202, combinations thereof, etc.

At 216 a decision is made as to whether to add lighting or any other visual effects. If the decision at 216 is YES, a decision is made at 218 as to whether to add lighting effects. If the decision at 218 is NO, a decision is made at 220 whether any other visual effects are to be added.

If the decision at 216 to add lighting or other visual effects is NO, then the subprocess 200 ends at the A connector.

If the decision at 218 to add lighting effects is YES, then a lighting setup process is carried out at 222 to set up the lighting effects for the scene. Once the lighting effects are set up, a decision is made at 224 as to whether to add additional visual effects.

If the decision to add additional visual effects at 224 is NO, then the subprocess 200 ends at the A connector.

If the decision at 220 to add additional visual effects is YES, then additional visual effects are set up at 226, and the subprocess 200 ends at the A connector.

If the decision at 220 to add additional visual effects is NO, then the subprocess 200 ends at the A connector.

Video Capture

Figure 2B:
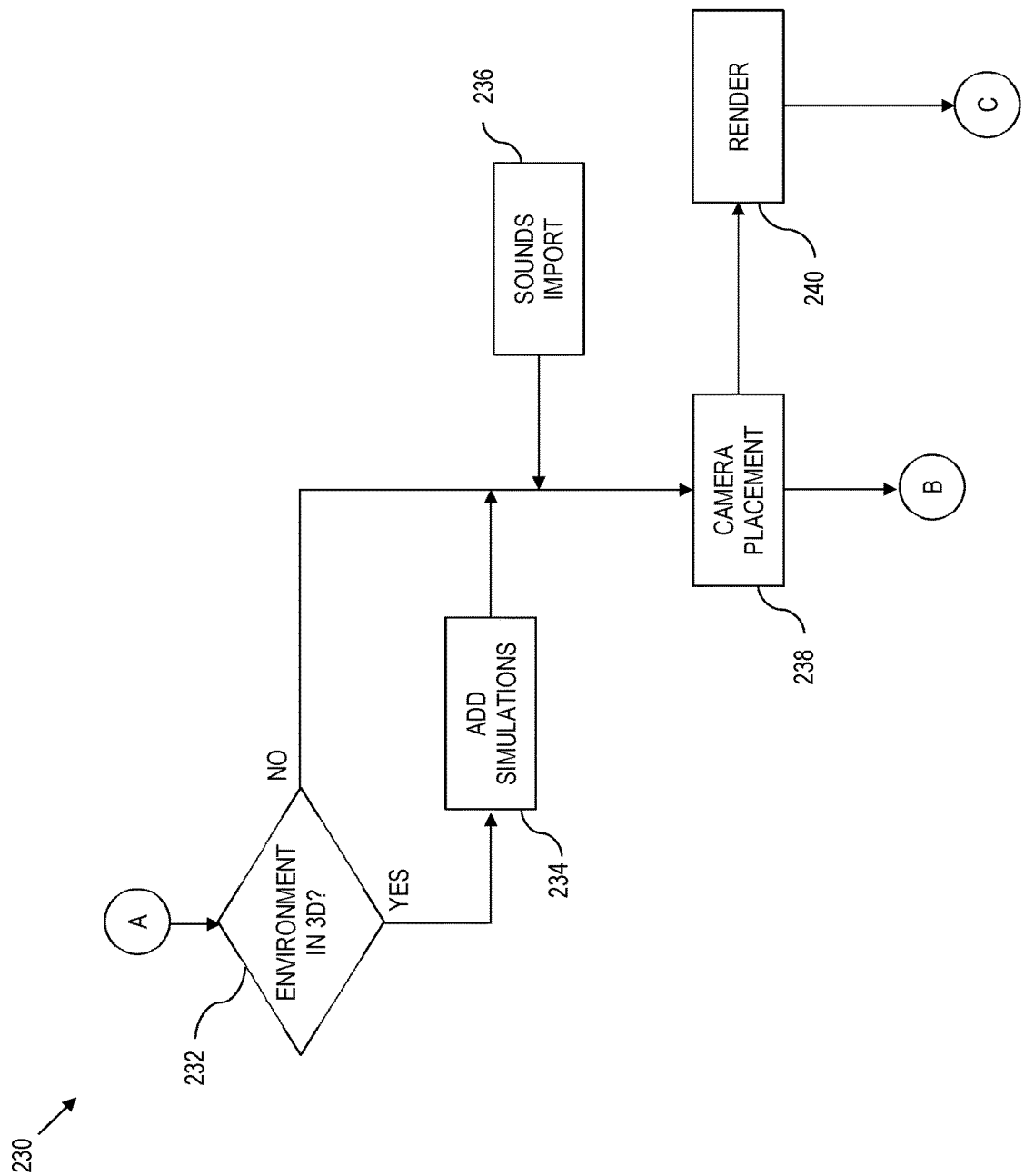
FIG. 2B is a block diagram of a video capture process according to aspects herein.

Referring to FIG. 2B, a block diagram illustrates an example of a video capture subprocess according to aspects herein. The subprocess 200 can be utilized to implement the Video footage capture 130 and/or render 132 (FIG. 1). As noted in the Figures, the subprocess of FIG. 2B can be run on its own, or the subprocess of FIG. 2B may flow from the end of the subprocess of FIG. 2A, as denoted by the A connector.

A decision is made at 232 as to whether an environment associated with a scene is in a three-dimensional (3-D) environment.

If the decision at 232 is YES, then a simulation process 234 is carried out to add the simulations desired to support the three-dimensional environment of the scene.

If the decision at 232 is NO, or if the simulations (if any) are added at 234, the subprocess 230 continues. In this regard, and optional audio process at 236 is carried out to import/add audio, sounds, and other audible effects.

Camera placement is then controlled at 238. As noted more fully herein, the camera placement can be controlled by cinematographic elements according to a timeline to dynamically control a point of view and/or a reference perspective for the scene, e.g., via the reference point described more fully herein.

After capturing video at 238, the subprocess 230 can optionally render the video for viewing at 240, which includes imported audio, simulations, etc.

The process 230 can end from the camera placement at 238, e.g., at the B connector. Also and/or alternatively, the process 230 can end after the render at 240, e.g., at the C connector.

Cinematographic Process

Figure 2C:
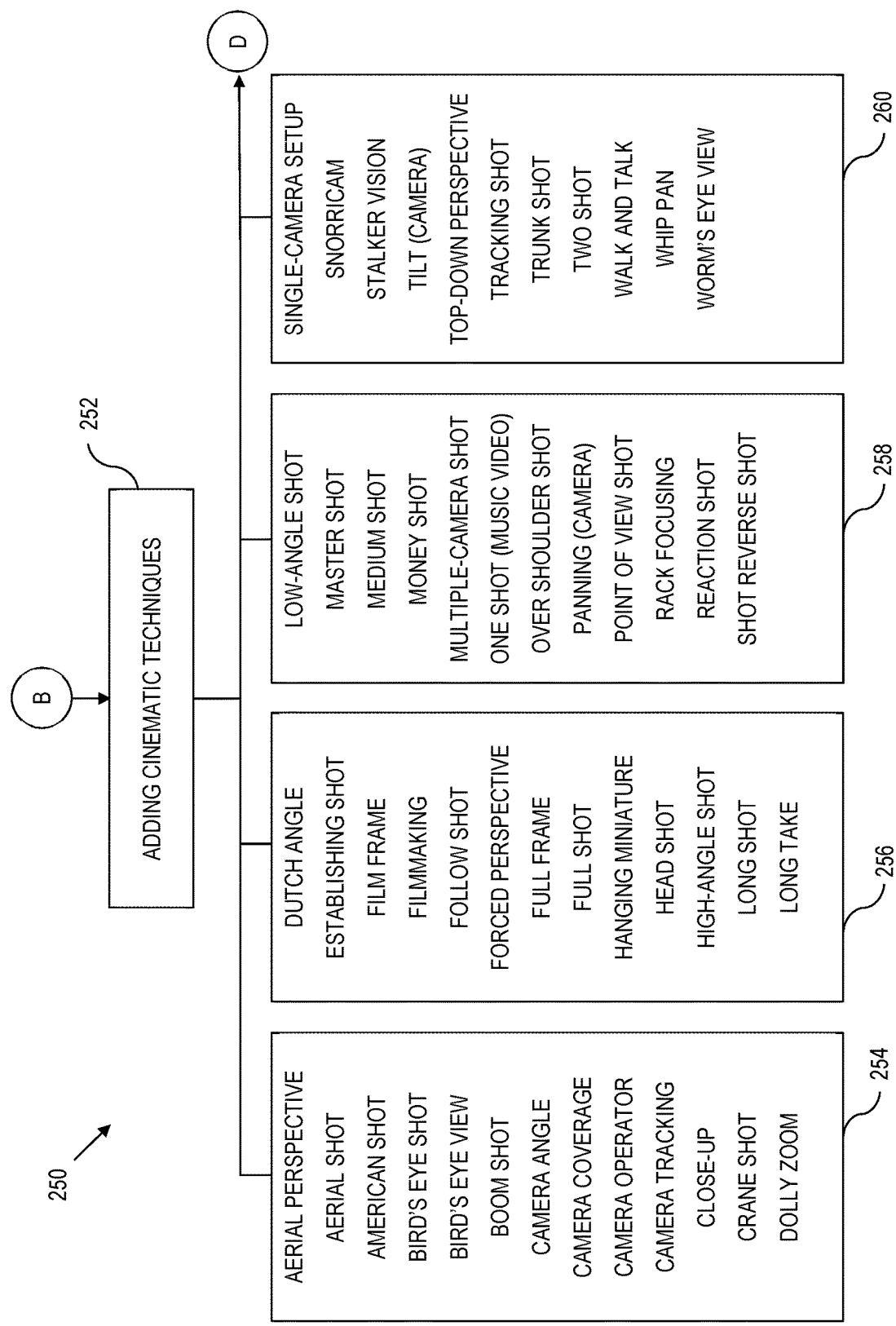
FIG. 2C is a block diagram of a cinematographic process according to aspects herein.

Referring to FIG. 2C, a block diagram illustrates an example cinematographic subprocess according to aspects herein. The subprocess 250 can be utilized to implement the cinematographic component 128 and/or the cinematographic component 140 (FIG. 1). As noted in the Figures, the process of FIG. 2C can be run on its own, or the subprocess of FIG. 2C may flow from the end of the process of FIG. 2B, as denoted by the B connector.

The subprocess 250 comprises adding cinematographic effects to the video. As noted more fully herein, the cinematographic effects can change, even dynamically, the perspective, reference point, etc., that informs the camera of the panoramic orientation. For instance, the insertion of a cinematographic effect based upon the timeline can affect a location, orientation, zoom, focus, etc., of the reference point. Thus, the orientation and location of the panoramic angle captured in a particular scene of the video can change, move, pan, jump, etc., based upon the desired effect, Notably, during playback of the video, the user can change the field of view, e.g., using an input on a corresponding graphical user interface, e.g., accelerometer, touchscreen, mouse input, etc. However, the ability of the viewer to change the field of view is dictated by the cinematographic effect of the frame/scene being displayed. That is, the viewer can "look around" from the perspective of the reference point dictated by the cinematographic effect as the video plays through the scene. Notably, the cinematographic effect does not constrain the video to first person views. Thus, the viewer has full control of where to look around while viewing the video, constrained only by the panorama captured by the process. However, the cinematographic effects can be used to direct, focus, or otherwise suggest an area of interest as the video plays back.

Here, the cinematographic effects are given names that correspond to effects well understood in the field of cinemaphotography, and thus the functionality herein is analogous to that understood in the field of cinemaphotography except as otherwise described herein.

Example cinematographic effects at 254 include:

Aerial perspective, aerial shot, American shot, bird's eye shot, bird's eye view, boom shot, camera angle, camera coverage, camera operator, camera tracking, close-up, crane shot, and dolly zoom.

Example cinematographic effects at 256 include:

Dutch angle, establishing shot, film frame, filmmaking, follow shot, forced perspective, full frame. full shot, hanging miniature, head shot, high-angle shot, long shot and long take.

Example cinematographic effects at 258 include:

Low-angle shot, master shot, medium shot, money shot, multiple-camera shot, one shot (music video), over shoulder shot, panning (camera), point of view shot, rack focusing, reaction shot, and shot reverse shot.

Example cinematographic effects at 260 include:

Single-camera setup, snorricam, stalker vision, tilt (camera), top-down perspective, tracking shot, trunk shot, two shot, walk and talk, whip pan, and worm's eye view.

Regardless of the cinematographic effect(s) added, the process 250 can end, e.g., at the D connector.

Post Production

Figure 2D:
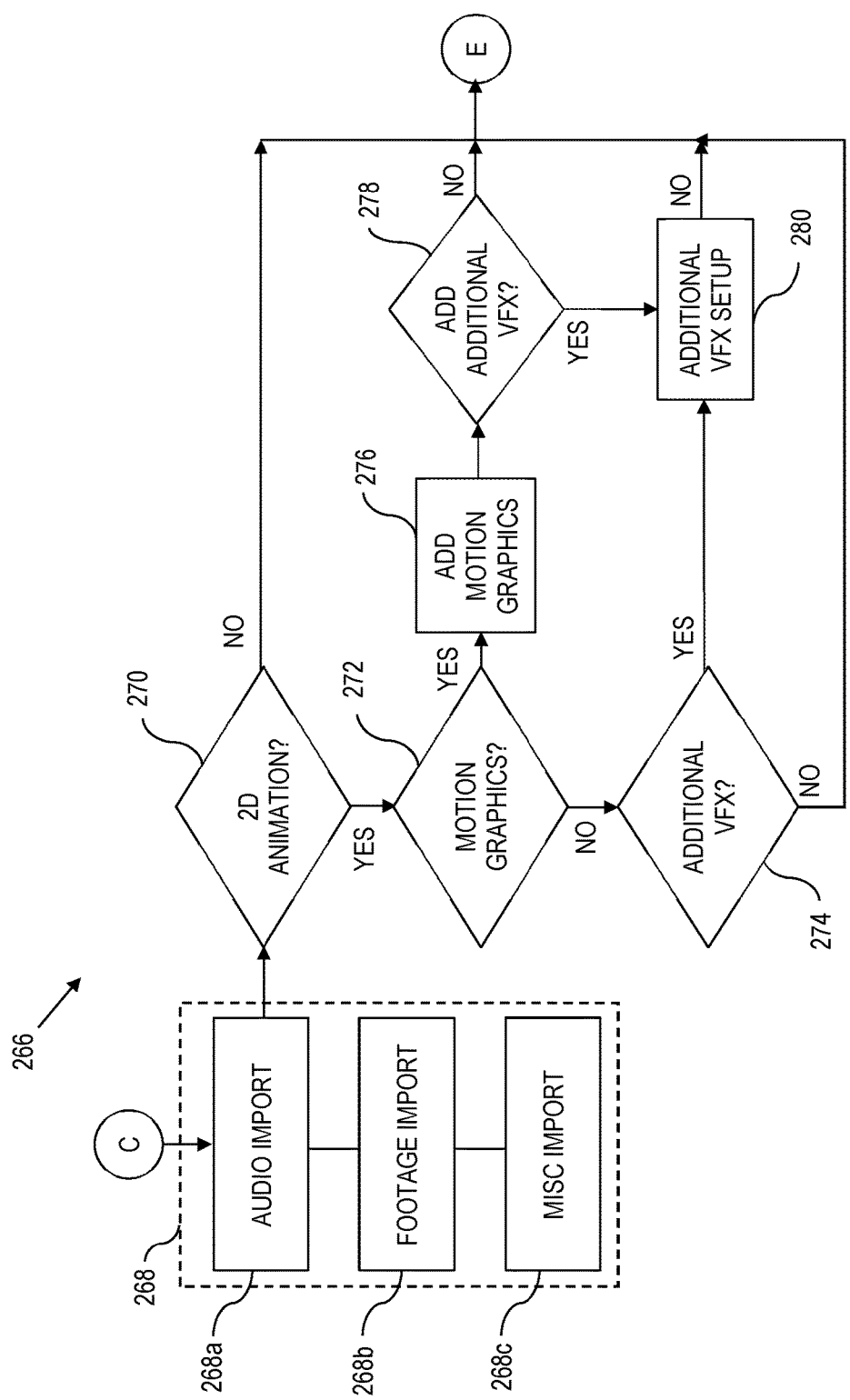
FIG. 2D is a block diagram of a post production process according to aspects herein.

Referring to FIG. 2D, a block diagram illustrates an example of a post production subprocess 266 according to aspects herein. The post production subprocess 266 can be utilized to implement the post production at 134 and any optional subsequent processes (FIG. 1). As noted in the Figures, the subprocess of FIG. 2D can be run on its own, or the subprocess of FIG. 2D may flow from the end of the subprocess of FIG. 2B, as denoted by the C connector.

The subprocess 266 starts by collecting imported content at 268. Example imports include an audio/sound import at 268A, a video/image/footage import at 268B, a miscellaneous content import at 268C, etc.

After importing at 268, a decision is made at 270 whether the video includes two-dimensional animation. If the decision at 270 is YES, a decision is made at 272 as to whether the video requires motion graphics. If the decision at 272 is NO, then a decision is made at 274 as to whether additional visual effects are required.

If the decision at 270 was NO, then the subprocess 266 ends, e.g., at connector E.

If the decision at 272 is YES, then motion graphics are added to the video at 276. Next, a decision is made at 278 as to whether additional visual effects are required for the video. If the decision at 278 is NO, then the subprocess 266 ends, e.g., at connector E.

If the decision 278 is YES, then additional visual effects setup is performed at 280 and the subprocess 266 ends, e.g., at connector E.

If the decision at 274 is YES, then the flow also flows to the additional visual effects setup at 280. If the decision at 274 is NO, then the subprocess 266 ends.

Cinematographic Process

Figure 2E:
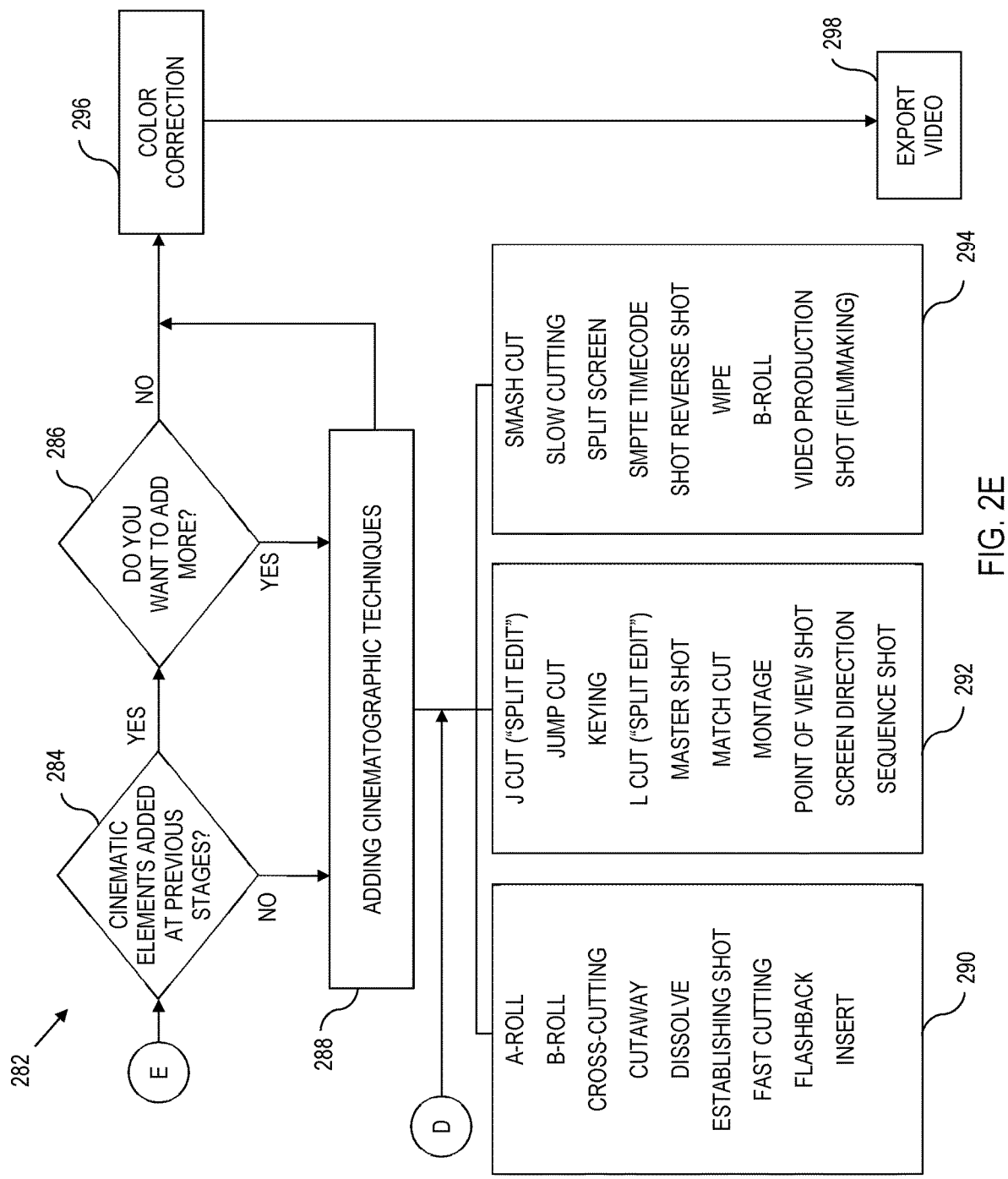
FIG. 2E is a block diagram of another cinematographic process according to aspects herein.

Referring to FIG. 2E, a block diagram illustrates an example of another cinematographic subprocess 282 according to aspects herein. The subprocess 282 can be utilized to implement the cinematographic component 128 and/or the cinematographic component 140 (FIG. 1). As noted in the Figures, the process of FIG. 2E can be run on its own, or the process of FIG. 2E may flow from the end of the process of FIG. 2C, as denoted by the D connector and/or via the process of FIG. 2D, as denoted by the E connector.

If entering the subprocess from connector E, a decision is made at 284 as to whether a cinematographic element was added at a previous stage. If the decision at 284 was YES, then a decision is made at 286 as to whether to add more cinematographic effects.

If the decision at 284 is NO, or the decision at 286 is YES, the subprocess flows to 288 to add one or more cinematographic techniques.

Example cinematographic effects at 290 include:

A-roll, b-roll, cross-cutting, cutaway, dissolve, establishing shot, fast cutting, flashback, and insert.

Example cinematographic effects at 292, include:

J cut ("split edit"), jump cut, keying, 1 cut ("split edit"), master shot, match cut, montage, point of view shot, screen direction, and sequence shot.

Example cinematographic effects at 294, include:

Smash cut, slow cutting, split screen, SMPTE (Society of Motion Picture and Television Engineers) timecode, shot reverse shot, wipe, b-roll, video production, and shot (filmmaking).

After performing any desired cinematographic effects processing, optional color correction is performed at 296, and the video is exported at 298.

As a few non-limiting examples, aspects herein support cinematographic effects such as Long Shot (LS)/Wide Shot (WS). For instance, if the subject in the video includes a person, then the person's whole body will be in view—but not filling the shot.

The Classical close-up shoot as per its additional embodiments is a new approach where the user has the freedom to move around the perspective in the close-up and total.

The Full Shot (FS) is a camera shot that lets a subject fill the frame while keeping emphasis on scenery.

The Medium Long Shot (MLS)/Medium Wide Shot (MWS) is a medium long shot (i.e., medium long shot) that frames the subject from roughly the knees up. This shot splits the difference between a full shot and a medium shot.

The Cowboy Shot is a variation on this is the Cowboy Shot, which frames the subject from roughly mid-thighs up. This shot is called a "cowboy shot" because it is used in Westerns to frame a gunslinger's gun or holster on his hip.

The medium shot is one of the most common camera shots. This shot is similar to the cowboy shot above, but frames from roughly the waist up and through the torso. So, this shot emphasizes more of the subject while keeping the surroundings visible.

The medium close-up frames the subject from roughly the chest up. So, this shot typically favors the face but still keeps the subject somewhat distant.

A close-up shot is used to reveal a subject's emotions and reactions. The close-up camera shot fills the frame with a part of the subject. If the subject is a person, the close-up shot is often the subject's face.

An extreme close-up shot fills most of a frame with the subject. This shot often shows eyes, mouth, etc. In extreme close-up shots, smaller objects get great detail and are the focal point.

Furthermore, an establishing shot is a shot at the head of a scene that clearly shows us the location of the action. This shot often follows an aerial shot and is used to show where everything will happen.

The low angle shot frames the subject from a low camera height looking up at them. These camera shots most often emphasize power dynamics between characters.

In a high angle shot, the camera points down at the subject. This shot can be used to create a view "looking down" on the subject.

A hip level shot is when your camera is roughly waist-high.

A Knee Level Shot is when the camera height is about as low as the subject's knees. This shot can be paired with a low angle for dramatic visual effect.

A Ground Level Shot is when the camera's height is on ground level with your subject. This shot captures what is happening on the ground the subject stands on.

A Shoulder-Level Shot is when the camera is roughly as high as the subject's shoulders. Shoulder level shots are actually much more standard than an eye level shot, which can make the subject seem shorter than reality.

System Overview

Figure 3:
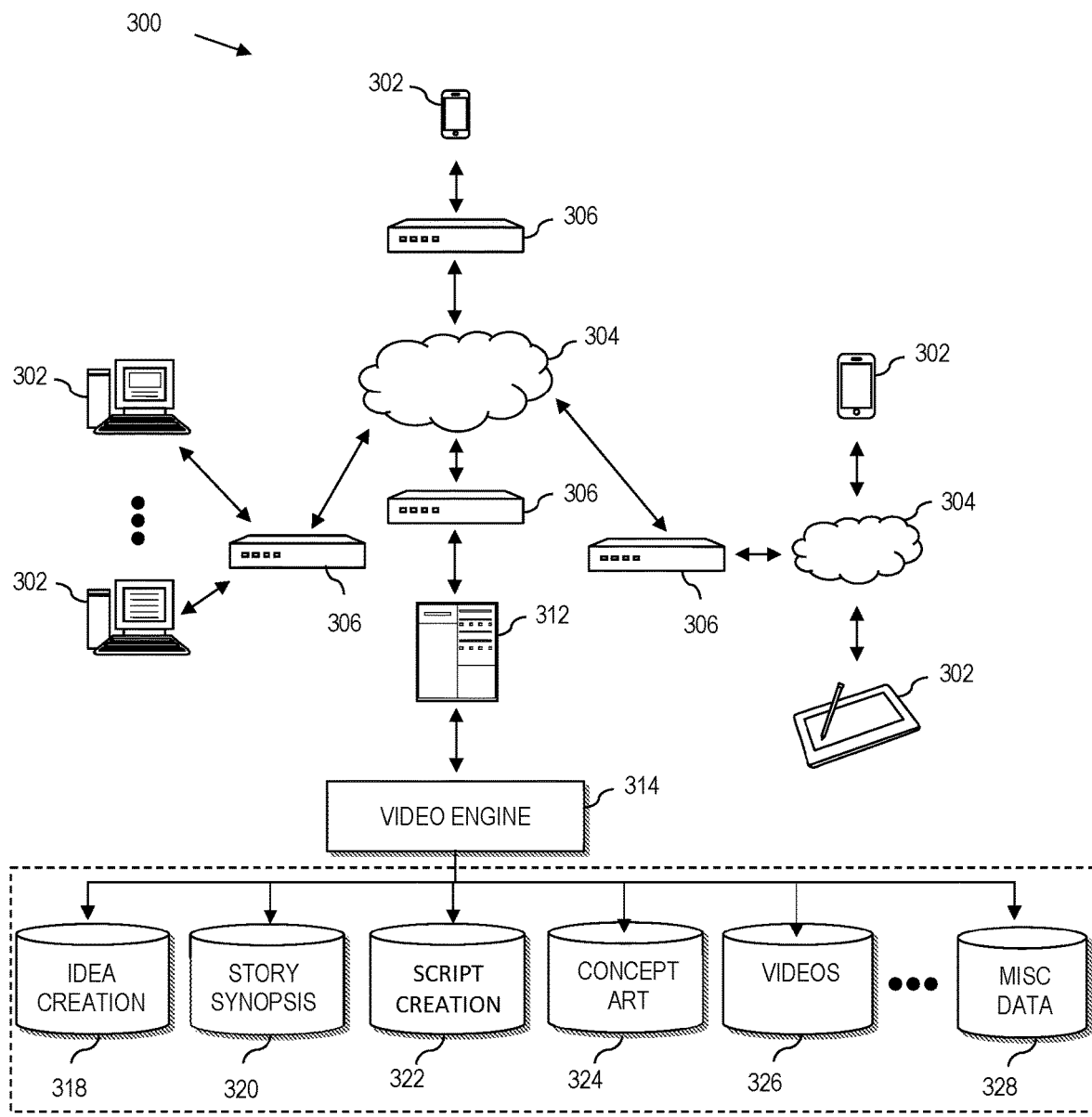
FIG. 3 is a system diagram illustrating a computer system sufficient for rendering video content as described more fully herein.

Referring now to the drawings and in particular to FIG. 3, a general diagram of a system 300 is illustrated according to various aspects of the present disclosure. The illustrated system 300 is a special purpose (particular) computing environment that includes a plurality of hardware processing devices (designated generally by the reference 302) that are linked together by one or more network(s) (designated generally by the reference 304).

The network(s) 304 provides communications links between the various processing devices 302 and may be supported by networking components 306 that interconnect the processing devices 302, including, for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 304 may comprise connections using one or more intranets, extranets, local area networks (LAN), wide area networks (WAN), wireless networks (WiFi), the Internet, including the world wide web, cellular and/or other arrangements for enabling communication between the processing devices 302, in either real time or otherwise (e.g., via time shifting, batch processing, etc.).

A processing device 302 can be implemented as a server, personal computer, laptop computer, netbook computer, purpose-driven appliance (e.g., VR goggles), cellular device such as a cellular mobile smartphones, tablet computer and/or other device capable of communicating over the network 304.

The illustrative system 300 also includes a processing device implemented as a server 312 (e.g., a web server, file server, and/or other processing device) that supports a video engine 314 and corresponding data sources (collectively identified as data sources 316).

In an exemplary implementation, the data sources 316 include a collection of databases that store various types of information related to the creation of video content, including animated video content, as set out in greater detail herein.

By way of example, the data sources 316 are illustrated as including an idea creation data source 318 (which can store data generated in the idea creation process 104, FIG. 1).

The data sources 316 are also illustrated as including an story synopsis data source 320 (which can store data generated in the story synopsis process 106, FIG. 1).

The data sources 316 are further illustrated as including an script creation data source 322 (which can store data generated in the script creation process 108, FIG. 1).

The data sources 316 are moreover illustrated as including a concept art data source 324 (which can store data generated in the script creation process 110, FIG. 1). The data sources 316 are also illustrated as including a video data source 326 that can store rendered video content.

The data sources 316 are also illustrated as including a miscellaneous data source 328, which can comprise one or more data sources for storing executable program code to create the videos, and/or to store miscellaneous files required to create a video, e.g., raw camera footage, sound/audio files, graphics, etc.

Example Implementation

By way of illustration and not by way of limitation, a scene may comprise a capture in a 180° format. In this configuration, the video production is sometimes called virtual reality (VR) video production. VR video production is particularly useful to creators who want to optimize their videos to provide interactive experiences for viewers who consume the content, even when using non-VR headset devices, such as mobile phones, tablets, laptops, PCs, game consoles, etc. For instance, as described more fully herein, optimization can be achieved by applying traditional movie elements (via the cinematographic processes) including edits, cuts, transitions, framing, camera angles, etc., with 180° video.

Traditionally, a user of a VR video technology (e.g., a VR headset device and goggles) would have to move their head, and hence move the corresponding headset device. However, VR video technology can be consumed without the use of a VR headset and goggles. For instance, a VR effect can be achieved on a smart phone by either moving the smart phone or using gesture commands entered on the touchscreen of a smartphone to navigate the video.

Even where a VR video technology (e.g., a VR headset device and goggles) is available, some users may prefer to consume VR video content with a conventional two-dimensional computer display, such as on a smartphone, tablet, laptop, desktop computer, etc. Such uses may be derived out of comfort, convenience, access, or other reasons. Unfortunately, the use of non-VR devices traditionally limits the immersive nature of the experience. However, aspects herein produce VR content in a way that provides a compelling experience, even on a non-VR device.

VR video use started as an accommodation to fulfill hardware expectations. Hardware (VR goggles and similar devices) are built up around the pre-existing notion that content users are watching should always be in first person (point of view), without enhancing the video material itself. While a first person constraint may be driven by the freedom that VR hardware provides to the viewer, such a constraint does not always make for an enriched experience for VR content consumers not using VR hardware.

However, aspects herein help video creators provide more optimized and compelling narratives in 180° to those who want to watch these videos with non-VR hardware.

Aspects herein can alleviate at least to some extent one or more of the aforementioned problems of the prior art by providing an intentional blend of traditional movie language with 180° animated video technology during the assembly part of video creation.

Aspects herein further incorporate traditional movie language in the following elements of the aforementioned assembly process: e.g., edits, cuts, transitions, framing, camera angles, etc.

Yet further, aspects herein provide traditional movie elements which are first incorporated during the initial assembly process, e.g., using a game engine (e.g., Unreal Engine). According to certain aspects herein, after the initial assembly process, processes enable continued use of professional video editing software to implement edits, cuts, transitions, zoom-ins, and zoom outs, panning to the left and right of the video footage exported from the software, e.g., a game engine.

Further aspects herein provide other features, such as the ability to add additional camera angles, adjustments using traditional movie elements, sound effects, music, visual effects (VFX), lightning effects, combinations thereof, etc., to the video.

Once the final video export and upload to any available VR video player on devices such as mobile phones, tablets, laptops, PCs, and consoles. In this regard, aspects herein enable the end viewers of the product to have a more comprehensive and optimized narrative experience when viewing them from the aforementioned devices.

ADDITIONAL EXAMPLES

Aspects herein provides a blend of traditional movie language with panoramic (e.g., 180°) animated video technology during the assembly part of video creation. Traditional movie language can be incorporated in the elements of the aforementioned assembly process, such as for edits, cuts, transitions, framing, camera angles, etc.

In an example implementation, for each shoot as per its further embodiments in the storyboard (with extended frames), a user defines the movement of the camera, and camera angle (e.g., God shot), e.g., via the cinematographic elements and reference point. By way of example, a traditional wide shots serves a purpose to describe the scene. In this case, aspects herein merge the wide shot with the panorama (e.g., 180 degree format) to provide a more immersive user experience because the user can watch the video playback with appropriate queues provided by the process. However, the user is free to look around in the scene to the extent of the panorama.

That is, in some embodiments herein, the cinematographic effects initially guide the viewer to look at the video content from a desired perspective, which may simulate a movie like experience with dynamic changes similar to changes in perspective at movies. However, a graphical user interface (GUI) associated with a device playing back the video enables the user to take control and change the field of view within the panoramic view defined by the perspective dictated by the video. For instance, a graphical user interface provide tools that enable the user, while watching the video playback, to alter the view normally selected as part of the playback. The user can interact with inputs provided by the GUI, e.g., an accelerometer, mouse, touch screen, etc., to zoom in, zoom out, pan to the left or right, make cuts, etc., to make the video experience seamless, give the video a new movie dynamic, e.g., by using rhythm, cut on sight, cut on movement, transition, e.g., to symbolize time continuity, to make a cut soften, to cross dissolve, to double exposure, to provide light leaks, dip to white or black, dissolve, slide, wipe, and 3-dimensional transitions.

An enhanced approach where optimization is achieved by applying traditional movie elements including edits, cuts, transitions, framing, camera angles with the 180° video. The invention enables the end viewers to have a more comprehensive and optimized narrative experience when viewing them from their devices.

A new and advanced approach herein allows creators to produce optimized video experiences, including VR, animations, etc., when creating 180° meant for non-VR headset viewership. This process will help creators tell more comprehensive stories and narratives when creating 180° degree format video content. Furthermore, as a result of this process being used, end viewers will have a better viewership experience when watching 180° degree video content without VR headsets. Because of the technology herein, the end viewers will be able to have fully immersive experiences even if the end viewers do not have VR headsets available.

First Example Process

Figure 4:
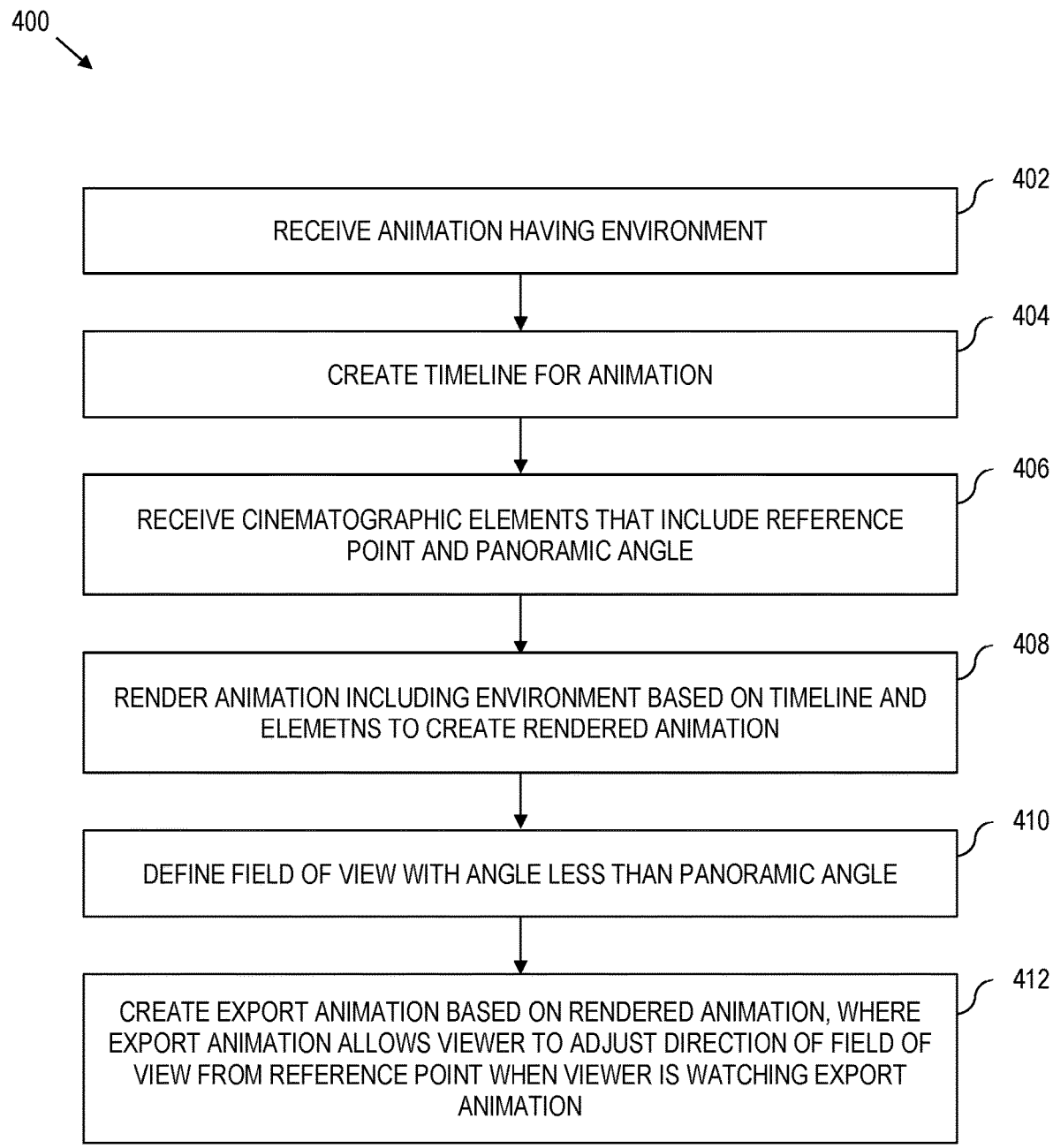
FIG. 4 is a flowchart illustrating a first process for generating dynamic panoramic video content, according to various aspects of the present disclosure.

FIG. 4 is a flowchart illustrating a process 400 for generating dynamic panoramic video content.

At 402, the process 400 receives an animation having an environment. The animation includes the environment and may further include characters, objects in the environment, models, features, etc., as described more fully herein, e.g., with regard to the animation collection component 118 (FIG. 1).

At 404, the process creates a timeline for the animation having the environment. In some embodiments, a storyboard is received for the animation having the environment. Here, the timeline is created based on the storyboard for the animation having the environment.

At 406, the process further receives cinematographic elements, which include a reference point and a panoramic angle. In this regard, the reference point and/or panoramic angle need not literally form a part of the cinematic effect. Rather, this merely means that the reference point and panoramic angle are associated with a corresponding cinematographic effect. A position of the reference point within the animation having the environment is based on the timeline. Also, the panoramic angle that includes a range of possible fields of view from the reference point. In some cinematographic effects, the reference point jumps to positions within the environment based on the timeline, e.g., in discontinuous jumps. In other examples, the reference point smoothly transitions to positions within the environment based on the timeline. In yet other examples, the reference point location within the environment is independent of a location of the viewer (thus not first person viewing). As yet further examples, the reference point location within the environment can be independent of a relative location of the viewer. The reference point location within the environment can also be independent of an absolute location of the viewer.

At 408, the animation having the environment is rendered based on the timeline and the cinematographic elements to create a rendered animation. In some examples, the process can add lighting, additional effects, 3-dimensional simulations of the environment, combinations thereof, etc.

At 410, a field of view with an angle that is less than the panoramic angle is defined. The definition at 410 need not literally be defined as such, but the software, either through parameter, default, or other definition, knows a view to render.

At 412, an export animation is created based on the rendered animation, where the export animation allows a viewer to adjust a direction of the field of view from the reference point when the viewer is watching the export animation. The process may also optionally add motion graphics to 2-dimensional animation, add visual effects to 2-dimensional animation, add color correction, combinations thereof, etc.

Second Example Process

Figure 5:
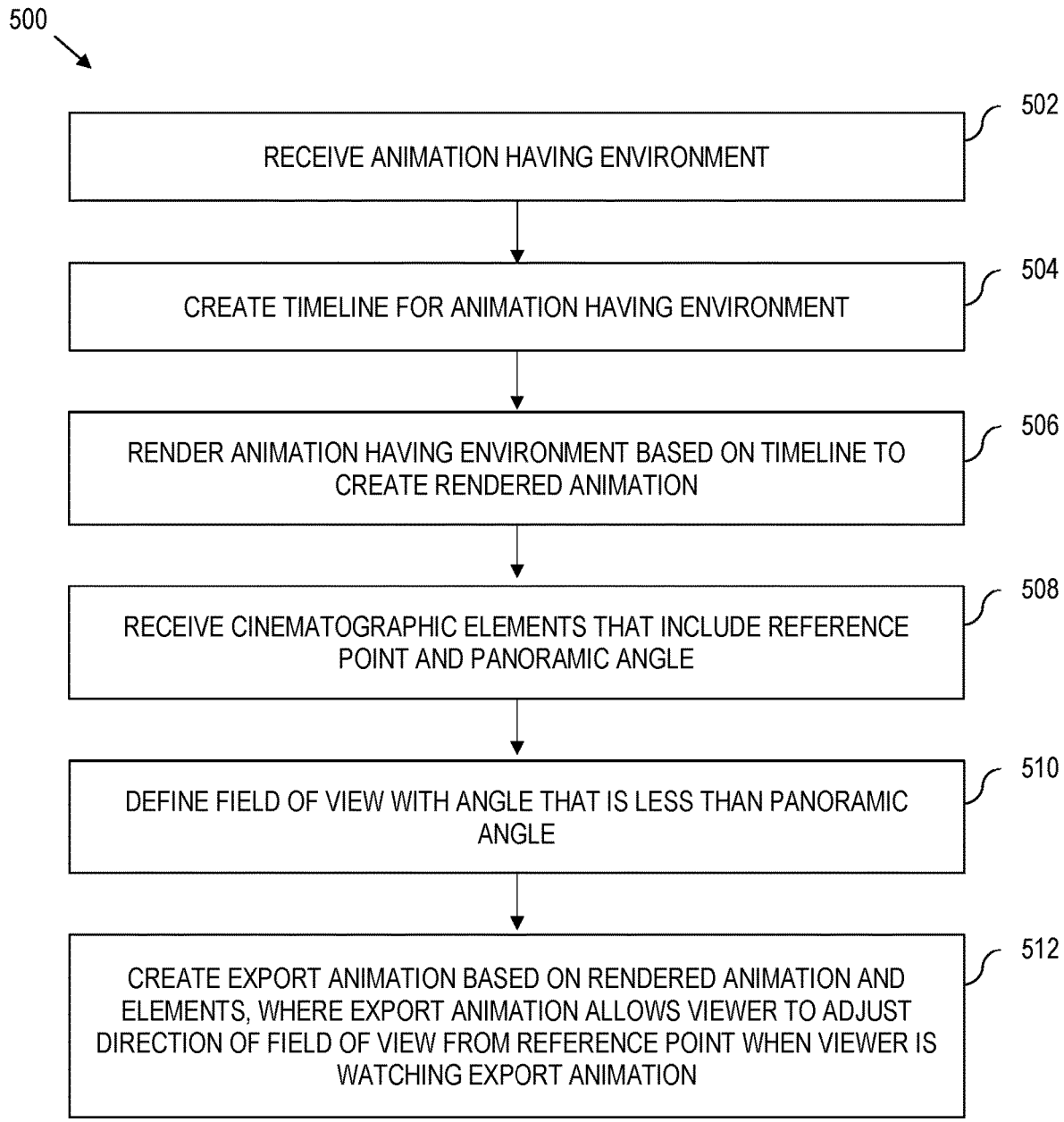
FIG. 5 is a flowchart illustrating a second process for generating dynamic panoramic video content, according to various aspects of the present disclosure.

Turning now to FIG. 5, a process 500 for generating dynamic panoramic video content is illustrated.

The process receives an animation having an environment at 502. Similar to that of FIG. 4. the animation includes the environment and may further include characters, objects in the environment, models, features, etc., as described more fully herein, e.g., with regard to the animation collection component 118 (FIG. 1).

The process creates a timeline for the animation having the environment at 504. The timeline can be created using any techniques set out more fully herein.

At 506, the process 500 further comprises rendering the animation having the environment based on the timeline to create a rendered animation. In this regard, similar to 406 of FIG. 4, the reference point and/or panoramic angle need not literally form a part of the cinematic effect. Rather, this merely means that the reference point and panoramic angle are associated with a corresponding cinematographic effect. A position of the reference point within the animation having the environment is based on the timeline. Also, the panoramic angle that includes a range of possible fields of view from the reference point. In some cinematographic effects, the reference point jumps to positions within the environment based on the timeline, e.g., in discontinuous jumps. In other examples, the reference point smoothly transitions to positions within the environment based on the timeline. In yet other examples, the reference point location within the environment is independent of a location of the viewer (thus not first person viewing). As yet further examples, the reference point location within the environment can be independent of a relative location of the viewer. The reference point location within the environment can also be independent of an absolute location of the viewer.

At 508, the process 500 comprises receiving cinematographic elements, which include a reference point and a panoramic angle. A position of the reference point within the animation having the environment is based on the timeline, and the panoramic angle that includes a range of possible fields of view from the reference point.

At 510, a field of view with an angle that is less than the panoramic angle is defined. The definition at 510 need not literally be defined as such, but the software, either through parameter, default, or other definition, knows a view to render.

At 512, an export animation is created based on the rendered animation and the cinematographic elements, where the export animation allows a viewer to adjust a direction of the field of view from the reference point when the viewer is watching the export animation. In some embodiments, the process for rendering the animation can optionally include adding lighting, adding additional effects, adding three-dimensional simulations of the environment, etc. Other examples include adding motion graphics to two-dimensional animation, adding visual effects to two-dimensional animation, adding color and/or other corrections, combinations thereof, etc.

In some embodiments, the first example embodiment of FIG. 4 can be combined with the second example embodiment of FIG. 5 by combining any combination of described features.

Video Example

Aspects herein can be adapted to real-world video such as augmented reality, or by replacing animations with real-world video elements. For instance, a process for generating dynamic panoramic video content can receive digital video elements, and receive digital environmental elements associated with an environment. The process then defines a digital reference point within the environment that varies according to a timeline. Here, the digital reference point is associated with a panoramic angle that includes a range of possible fields of view of the environment less than the panoramic angle from the reference point. The process then receives a cinematographic element that defines a discontinuous change in the position of the reference point within the environment at a set time on the timeline. For instance, the video camera perspective dictated by the reference point can jump from a first person perspective to an ariel shot, or other cinematographic effect described more fully herein. The process renders a video based upon the video elements within the environment according to the timeline, the cinematographic element, and a field of view to create an export video, where the export video allows a viewer to adjust a direction of the field of view from the reference point when the viewer is watching the export animation.

Miscellaneous

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Computer System Overview

Figure 6:
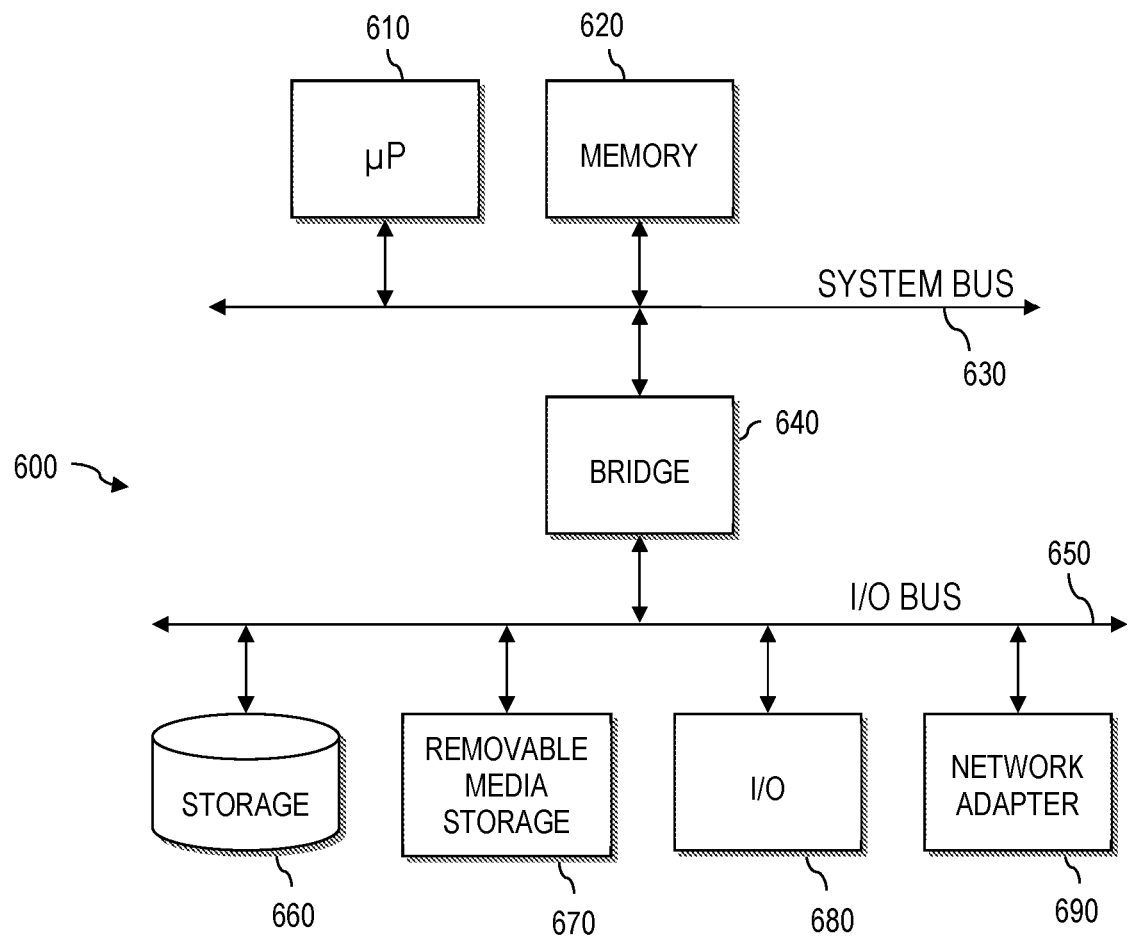
FIG. 6 is block diagram of a computer system for carrying out the processes described more fully herein.

Referring to FIG. 6, a schematic block diagram illustrates an exemplary computer system 600 for implementing the various methods described herein. The exemplary computer system 600 includes one or more (hardware) microprocessors (μP) 602 and corresponding (hardware) memory (e.g., random access memory 604 and/or read only memory 606) that are connected to a system bus 608. Information can be passed between the system bus 608 and bus 640 by a suitable bridge 610 to communicate with various input/output devices. For instance, a local bus 612 is used to interface peripherals with the one or more microprocessors (μP) 602, such as storage 614 (e.g., hard disk drives); removable media storage devices 616 (e.g., flash drives, DVD-ROM drives, CD-ROM drives, floppy drives, etc.); I/O devices such as input device 618 (e.g., mouse, keyboard, scanner, etc.) output devices 620 (e.g., monitor, printer, etc.); and a network adapter 622. The above list of peripherals is presented by way of illustration, and is not intended to be limiting. Other peripheral devices may be suitably integrated into the computer system 600.

The microprocessor(s) 602 control operation of the exemplary computer system 600. Moreover, one or more of the microprocessor(s) 602 execute computer readable code (e.g., stored in the memory 604, 606, storage 614, removable media insertable into the removable media storage 616 or combinations thereof) that instructs the microprocessor(s) 602 to implement the methods herein.

The methods and processes herein may be implemented as a machine-executable method executed on a computer system, e.g., one or more of the processing devices 302 of FIG. 3.

Thus, the exemplary computer system or components thereof can implement methods and computer-readable storage devices as set out in greater detail herein. Other computer configurations may also implement the methods and computer-readable storage devices as set out in greater detail herein. Computer program code for carrying out operations for aspects of the present invention may be written in any combination of one or more programming languages. The program code may execute entirely on the computer system 600 or partly on the computer system 600. In the latter scenario, the remote computer may be connected to the computer system 600 through any type of network connection, e.g., using the network adapter 622 of the computer system 600.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for generating dynamic panoramic video content, the process comprising:
   receiving an animation having an environment;
   creating a timeline for the animation;
   receiving cinematographic elements that include:
      a reference point, wherein a position of the reference point within the animation is based on the timeline; and
      a panoramic angle that includes a range of possible fields of view from the reference point;
   rendering the animation including the environment based on the timeline and the cinematographic elements to create a rendered animation;

defining a field of view with an angle that is less than the panoramic angle; and creating an export animation based on the rendered animation, where the export animation allows a viewer to use an input of an animation playback device to adjust a direction of the field of view from the reference point when the viewer is watching the export animation on a two-dimensional display that is not a virtual-reality (VR) headset device.

2. The process of claim 1, wherein receiving an animation having an environment comprises:
receiving the animation having the environment and animation of characters within the environment.

3. The process of claim 1, wherein creating a timeline for the animation having the environment comprises:
receiving a storyboard for the animation having the environment; and
creating the timeline based on the storyboard for the animation having the environment.

4. The process of claim 1, wherein receiving cinematographic elements that include a reference point comprises:
receiving cinematographic elements that include the reference point, wherein the reference point jumps to positions within the environment based on the timeline.

5. The process of claim 1, wherein receiving cinematographic elements that include a reference point comprises:
receiving cinematographic elements that include the reference point, wherein the reference point smoothly transitions to positions within the environment based on the timeline.

6. The process of claim 1, wherein receiving cinematographic elements that include a reference point comprises:
receiving cinematographic elements that include the reference point, wherein the reference point location within the environment is independent of a location of the viewer.

7. The process of claim 6, wherein receiving cinematographic elements that include the reference point, wherein the reference point location within the environment is independent of a location of the viewer comprises receiving cinematographic elements that include the reference point, wherein the reference point location within the environment is independent of a relative location of the viewer.

8. The process of claim 6, wherein receiving cinematographic elements that include the reference point, wherein the reference point location within the environment is independent of a location of the viewer comprises receiving cinematographic elements that include the reference point, wherein the reference point location within the environment is independent of an absolute location of the viewer.

9. The process of claim 1, wherein rendering the animation having the environment based on the timeline and the cinematographic elements to create a rendered animation includes:
adding lighting;
adding additional effects; and
adding 3-dimensional simulations of the environment.

10. The process of claim 1, wherein creating an export animation based on the rendered animation includes post-production to:
add motion graphics to 2-dimensional animation;
add visual effects to 2-dimensional animation; and
color correction.

11. A process for generating dynamic panoramic video content, the process comprising:
receiving an animation having an environment;
creating a timeline for the animation having the environment;
rendering the animation having the environment based on the timeline to create a rendered animation;
receiving cinematographic elements that include:
a reference point, wherein a position of the reference point within the animation having the environment is based on the timeline; and
a panoramic angle that includes a range of possible fields of view from the reference point;
defining a field of view with an angle that is less than the panoramic angle; and
creating an export animation based on the rendered animation and the cinematographic elements, where the export animation allows a viewer to use an input of an animation playback device to adjust a direction of the field of view from the reference point when the viewer is watching the export animation on a two-dimensional display that is not a virtual-reality (VR) headset device.

12. The process of claim 11, wherein receiving an animation having an environment comprises:
receiving the animation having the environment and animation of characters within the environment.

13. The process of claim 11, wherein receiving cinematographic elements that include a reference point comprises:
receiving cinematographic elements that include the reference point, wherein the reference point jumps to positions within the environment based on the timeline.

14. The process of claim 11, wherein receiving cinematographic elements that include a reference point comprises:
receiving cinematographic elements that include the reference point, wherein the reference point smoothly transitions to positions within the environment based on the timeline.

15. The process of claim 11, wherein receiving cinematographic elements that include a reference point comprises:
receiving cinematographic elements that include the reference point, wherein the reference point location within the environment is independent of a location of the viewer.

16. The process of claim 15, wherein receiving cinematographic elements that include the reference point, wherein the reference point location within the environment is independent of a location of the viewer comprises receiving cinematographic elements that include the reference point, wherein the reference point location within the environment is independent of a relative location of the viewer.

17. The process of claim 15, wherein receiving cinematographic elements that include the reference point, wherein the reference point location within the environment is independent of a location of the viewer comprises receiving cinematographic elements that include the reference point, wherein the reference point location within the environment is independent of an absolute location of the viewer.

18. The process of claim 11, wherein rendering the animation having the environment based on the timeline and the cinematographic elements to create a rendered animation includes:
adding lighting;
adding additional effects; and
adding 3-dimensional simulations of the environment.

19. The process of claim 11, wherein creating an export animation based on the rendered animation includes post-production to:
add motion graphics to 2-dimensional animation;
add visual effects to 2-dimensional animation; and
color correction.

20. A process for generating dynamic panoramic video content, the process comprising:
   receiving a script and concept art;
   creating a storyboard based on the script and the concept art;
   creating animation having an environment based on the storyboard, the script, and the concept art;
   receiving cinematographic elements;
   creating an image sequence based on the animation having the environment and the received cinematographic elements; and
   creating an export animation based on the image sequence, where the export animation allows a viewer to use an input of an animation playback device to adjust a direction of a field of view from a reference point when the viewer is watching the export animation on a two-dimensional display that is not a virtual-reality (VR) headset device.

* * * * *